United States Patent [19]

Stauber

[11] 4,023,413

[45] May 17, 1977

[54] DEVICE FOR MEASURING ACCELERATIONS, PARTICULARLY ACCELERATIONS DUE TO GRAVITY

[75] Inventor: Siegfried Stauber, Zurich, Switzerland

[73] Assignee: Wyler AG, Switzerland

[22] Filed: Feb. 25, 1976

[21] Appl. No.: 661,273

[30] Foreign Application Priority Data

Feb. 27, 1975 Switzerland .................... 2488/75

[52] U.S. Cl. ............................. 73/382 R; 73/517 B
[51] Int. Cl.² ..................... G01V 7/04; G01P 15/08
[58] Field of Search ............ 73/382, 516 R, 517 R, 73/517 B

[56] References Cited

UNITED STATES PATENTS

| | | | |
|---|---|---|---|
| 2,643,869 | 6/1953 | Clark | 73/517 R X |
| 2,767,973 | 10/1956 | ter Veen | 73/517 R |
| 2,870,422 | 1/1959 | Gindes | 73/517 R X |
| 2,958,137 | 11/1960 | Mueller | 73/516 R X |
| 3,151,486 | 10/1964 | Plummer | 73/517 B |
| 3,292,059 | 12/1966 | Woods | 73/516 R |
| 3,789,672 | 2/1974 | Davies | 73/516 R X |

Primary Examiner—James J. Gill
Attorney, Agent, or Firm—McGlew and Tuttle

[57] ABSTRACT

A device for measuring accelerations, particularly components of accelerations due to gravity comprises a stator having first and second spaced apart electrodes. A deflecting part is suspended between the first and second electrodes and it is displaceable under the influence of gravity in a direction toward one or the other electrodes and in so doing produces an electric signal which is proportional to the displacement amount. The signal is connected to means for indicating the magnitude of displacement as a measure of the acceleration acting upon the device.

4 Claims, 6 Drawing Figures

DEVICE FOR MEASURING ACCELERATIONS, PARTICULARLY ACCELERATIONS DUE TO GRAVITY

BACKGROUND OF THE INVENTION

Field of the Invention

Devices are known for measuring acceleration forces which include moving weight members which trigger a switch mechanism. A disadvantage in the known devices is that the measurements obtained are not always accurate and the constructions of such devices are complicated and expensive.

SUMMARY OF THE INVENTION

The present invention provides a device for measuring acceleration and particularly components of accelerations due to gravity and for measuring angles which includes a stator which is connected to a generator of an alternating electric field and a deflecting part which is mounted between electrodes of the stator so as to be movable relative to the stator and to produce an indication on a recording device which is proportional to the gravitational acceleration. The device of the invention is largely insensitive to oscillations and shocks and also to temperature variations and it makes it possible to obtain a very high accuracy of measurement. The device operates with a minimum of friction and permits not only measurements of small angles within a narrow measuring range but also measurements through a full angular range of from zero to 180°. In accordance with the invention this is achieved by providing the deflecting part in the shape of a disc and this is mounted between two stator parts and adapted to move so as to vary its spacing from the stator parts so that a direction dependent measurement signal is produced in the device which within the predetermined measuring range is at least approximately proportional to the gravitational or inertial forces acting on the deflecting part.

In an advantageous embodiment of the invention the deflecting part comprises a diaphragm which is secured at its periphery and has a central portion which is connected to the secured periphery of the diaphragm only through one or more areas. It is advantageous to give the diaphragm a circular shape and to separate the central deflectable portion of the diaphragm from the periphery by slots which extend in parallel to the circumference of the diaphragm so that the lands remaining between the slots form the connection to the periphery of the diaphragm. In addition it is possible to provide a plurality of concentric slots which are all set relative to one another in the circumferential direction so that only a very small elastic force of the diaphragm material is opposed to the deflection of the diaphragm.

In another embodiment of the device the slots are made as narrow as possible in order to obtain a strong damping through the medium which for example may be a gas or a liquid which is enclosed between the diaphragm and the adjacent stator parts. This provides protection against shocks since upon the deflection of the diaphragm the medium flows through the slots from one side of the diaphragm to the other. A damping in the direction of the plane of the diaphragm can be obtained by providing the diaphragm with a rim which extends perpendicular to the diaphragm. In addition a rod may be passed through an opening of the diaphragm and firmly connected to the stator parts.

In those cases where the device is used as a water balance or a leveling instrument or for measuring angles which deviate only slightly from the horizontal or vertical the deflecting part is electrically connected to a transducer in which the voltage produced at the deflecting part upon a deflection is converted into a signal proportional to the positional angle of the device and which is electrically connected to an indicator receiving signal.

For measuring angles through the entire range of zero to 180° or 360°, the design may be such that the stator is connected to a direct current source so that a d.c. voltage is superimposed upon the a.c. voltage applied to the stator. In addition an electrical connection is provided between the controller for the d.c. voltage and the deflecting part so that by controlling the d.c. voltage as a function of the a.c. voltage produced at the deflecting part, the deflecting part is held in a zero position. In this embodiment in addition the deflecting part may also be connected to a direct current source so that with an angle of zero that is if no gravitational inertia force acts on the deflecting part, the electrostatic force present at the deflecting part due to the d.c. voltage is balanced with the electrostatic force due to the d.c. voltage at the stator. In this manner electrostatic bias is maintained at the deflecting part.

Since the indication of the device is responsive both to gravitational and inertia forces the device may be used for measuring accelerations to which end either the angle indication is translated through a factor into an acceleration value or the indicator is provided with a scale for the acceleration values instead of or in addition to the graduation in angles.

Accordingly it is an object of the invention to provide a device for measuring accelerations which includes a diaphragm plate deflecting member arranged between two electrodes which are impressed with an alternating current voltage so that the deflector is in a neutral position and is deflectable due to inertia forces and including means connected to the deflector for measuring the signal produced by the deflection toward one electrode and away from another so as to give a value of the inertia forces acting thereon.

A further object of the invention is to provide an acceleration measuring device which includes a stator having electrodes arranged in spaced apart relationship with a deflection member disposed between the electrodes and which comprises a circular plate suspended at its periphery and having a central capacitor plate portion connected to an indicator means so as to record a signal due to the displacement in respect to the electrodes which are impressed with at least an alternating current voltage and advantageously also with a direct current voltage to maintain the deflection plate in a statically biased neutral position.

A further object of the invention is to provide a device for indicating accelerations which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
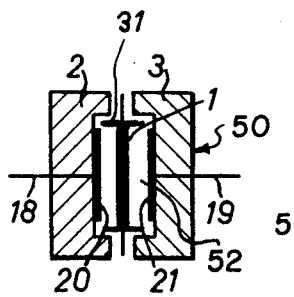
FIG. 1 is a transverse sectional view of an acceleration indicating device constructed in accordance with the invention.

Referring to the drawings in particular the invention embodied therein FIG. 1 comprises a device for measuring accelerations particularly components of acceleration due to gravity generally designated 50 which includes spaced apart housings 2 and 3 each having an electrode 20 and 21 arranged in spaced opposite relationship and connected through the housing to electrode leads 18 and 19 which impress an alternating current voltage on the electrodes 20 and 21. The housing parts 2 and 3 and the electrodes 20 and 21 define a cavity 52 therebetween which is advantageously filled with a medium which may be a gas or liquid or even a solid material providing a resilient bias on each side of a deflecting plate generally designated 1 which is supported at its periphery in the cavity 52 evenly spaced between the electrodes 18 and 19. The cavity 52 may for example be sealed by an annular rim 31 so that the action of deflecting movement of the deflecting part 1 will be dampened by the medium present in the cavity 52.

Figure 4:
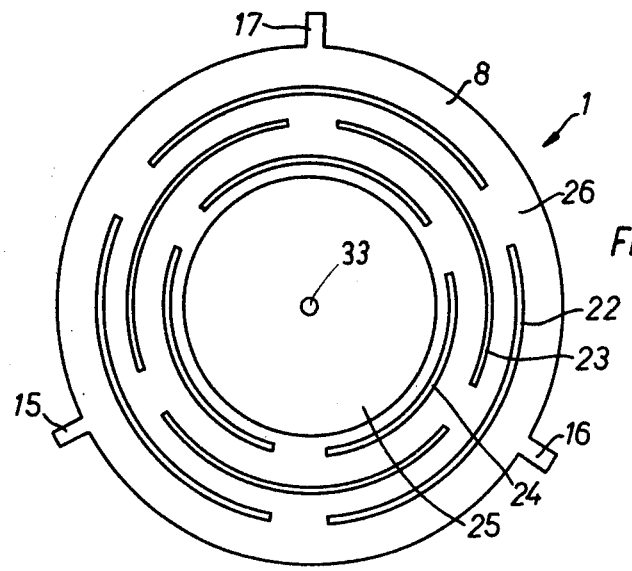
FIG. 4 is a front elevational view of a deflecting part of the devices shown in FIGS. 1, 2 and 3.

As shown in FIG. 4 the deflecting part 1 advantageously comprises a plate or disc 8 of circular form having a plurality of radially extending supporting tabs 15, 16 and 17 from which the plate is suspended. The central portion of the plate 8 includes a capacitor plate portion 25 which is resiliently supported in the center of the plate so that it may freely move during any acceleration change. In the preferred form of the invention the plate 8 is made with a plurality of circumferentially spaced arcuate slots 22, 23 and 24. The arcuate slots 22, 23 and 24 are radially spaced from each other and they are offset circumferentially. The slots 22, 23 and 24 weaken the diaphragm to an extent that the central portion thereof having the capacitor plate 25 can deflect out of the plane of the diaphragm under the influence of only a very small force. The slots 22, 23 and 24 leave lands 26 therebetween.

In a preferred arrangement the electrode plates 20 and 21 are sealed to the respective housing parts 2 and 3 by an adhesive such as an epoxy resin which provides a complete sealing and securing of the electrode plates 20 and 21 against displacement at greater shocks. In order to prevent a change in position of the electrode plates due to thermal expansion of the adhesive for example the arrangement is held under elastic bias even after assembly. For this purpose usual clamping members not shown may be used which embrace the device.

Figure 2:
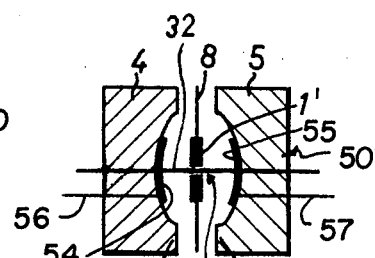
FIGS. 2 and 3 are views similar to FIG. 1 of alternate embodiments of the invention.

In the embodiment shown in FIG. 2 an aceeleration measuring device generally designated 50' includes housing portions 4 and 5 having electrode plates 54 and 55 formed in an arcuate fashion on each side of a deflecting plate 1' which is suspended by radially extending suspension means 8 between the housing parts and between the electrodes 54 and 55. In this embodiment the capacitor plate 25 includes an opening 33 to permit passage of an absorbing rod 32 which is secured in the housing parts 4 and 5 and permits movement of the deflecting part 1' but provides a damping of the movement. The leads 56 and 57 for the electrodes 54 and 55, respectively, are passed through the housing parts 4 and 5 and are sealed thereto by suitable sealing compound. For sealing the electrode plates and the diaphragm a material is advantageously used which does not expand under thermal influence, for example invar or a special quartz without thermal expansion characteristics and this substance may have deposited on it electrode plates as a conducting layer by evaporation. It is also possible to use the same material as for the deflecting part 1' in order to eliminate stresses and deformations due to unequal coefficients of thermal expansion, however an electrically conducting material is preferred.

Figure 3:
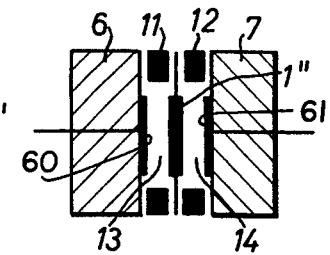

In the embodiment shown in FIG. 3 housing parts 6 and 7 have cavities or chambers 13 and 14 defined on respective sides of a deflecting part 1" and these chambers are sealed by annular rings 11 and 12 which also support the deflecting part 1" for pivotal movement. The rings 11 and 12 may be sealed to the housing parts 6 and 7 by sealing material such as an epoxy resin.

The operation of the device is as follows:

In principle the measurement of acceleration may be obtained on the basis of the variation of capacitance which is effective between the capacitor plate 25 and the electrode plates 20 and 21, 54 and 55 and 60 and 61 of each of the embodiments of FIGS. 1, 2 and 3, respectively. Any acceleration force will deflect the capacitor plate 25 from its neutral or zero position. For the purpose of measuring angles of deflection the zero position coincides with a vertical extension of the plane of the diaphragm. Upon a very small deviation from the zero position the central portion of the diaphragm carrying the capacitor plate 25 will already be deflected by a small amount so that a voltage is generated in the deflecting part which can be evaluated or an indication. The signal produced is transmitted through a connection to the deflecting part extending to an electrical device for measuring this capacitance change so as to give an indication of the actual acceleration which has occurred as an angle measurement or as an absolute value which is scaled off in accordance with the electrical indication which is effected.

Figure 5:
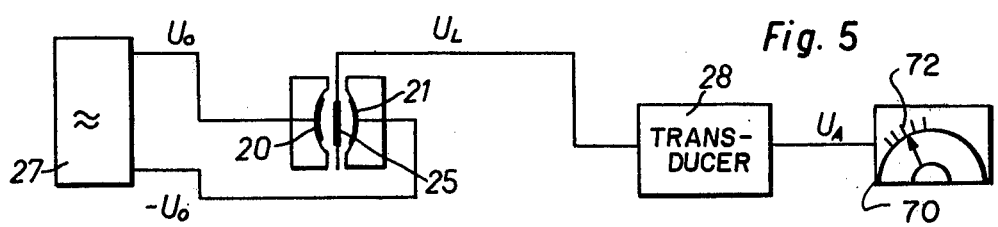
FIG. 5 is a schematic electrical connection diagram of the device shown in FIG. 1.

As shown in FIG. 5 the electrode plate 20 and 21 of the embodiment of FIG. 1 are connected to a generator 27 which produces an alternating voltage $U_o$ so that the voltage is of identical amplitude and frequency but dephased by 180° are applied to electrode plates 20 and 21. Thereby the voltages acting on the capacitor plate 25 of the deflecting part 1 neutralize each other so long as the capacitor plate 25 is exactly in the central position between the plates 20 and 21. As soon as under the influence of gravity or inertia forces, the capacitor plate 25 is brought off this central position, an a.c. voltage $U_L$ appears at the capacitor plate due to the capacitance variations between the electrode plate and the capacitor plate. The capacitor plate 25 is therefore electrically connected to a transducer 28 in which the a.c. voltage $U_L$ is converted into a measuring signal $U_a$ which is connected to an instrument 70 having a graduations thereon 72 which may be in the form of angles or an absolute indication of accleration. A simple calculation of the occurring variations of the capacitance following a change of the angular position of the device makes it possible to prove that for small angles that is within a range where with a satisfactory approximation the sine is equal to the arc, voltage $U_L$ is proportional to the variation of the angle. The apparatus shown in FIG. 5 is particularly suitable for cases where only small angular deviations from the vertical or the horizontal are to be measured as for example if the device is used as a sort of water balance. For such a purpose the assembly of the embodiments of FIGS. 1, 2 and 3 in a block form having outside surfaces which are exactly parallel or perpendicular to the plane of the diaphragm shaped deflecting part is employed.

Figure 6:
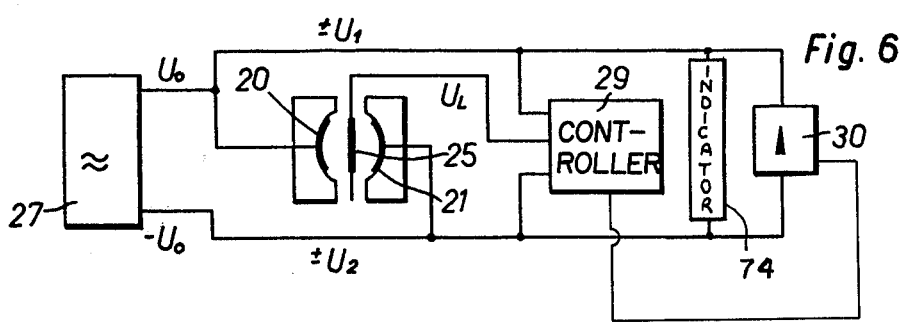
FIG. 6 is a view similar to FIG. 5 of another embodiment of the invention.

In the embodiment shown in FIG. 6 angles can be measured with a high accuracy in the entire range of from zero to 180° or up to 360° since in this design no substantial deflection of the capacitor plate 25 can occur. The deflection is prevented by a d.c. voltage $U_1$, $U_2$ which is controlled as a function of the voltage $U_L$ which is delivered by the capacitor 25 of the deflecting element 1 through a controller 29. The DC voltage is superimposed on the a.c. voltage $U_o$ applied to the electrode plates 20 and 21 so that the capacitor plate 25 is held in a zero position due to its controlled d.c. voltage as against the electrostatic force acting thereon. The direct current $U_1$ and $U_2$ is generated by a direct current source 30 which is controlled by the controller 29 to the extent that the capacitor plate 25 is again returned into its zero position, that is that the a.c. voltage $U_L$ is reduced to zero. A higher or a lower d.c. voltage $U_1$, $U_2$ is needed in dependence upon the magnitude of the force acting on the capacitor plate 25 and in dependence upon the change of angular position of the plate 1 away from the neutral position. Therefore, the magnitude of the voltage $U_1$, $U_2$ which is delivered to an indicator 74 can be directly used for the indication of the angle or of the inertia force. It may be proved by calculation that in this embodiment the sine of the angle to be measured is proportional to the difference between the voltage $U_1^2 - U_2^2$.

In addition a d.c. voltage may be applied to capacitor plate 25 in which case the electrostatic force thereby produced is neutralized by a corresponding d.c. voltage at the electrode plates 20 and 21 even if no gravitational or inertia forces are acting on the capacitor plate 25. This results in a greater difference between the voltage at the capacitor plate and the voltage at the electrode plates with the effect of a higher measuring accuracy and a faster return of capacitor plate 25 into its zero position.

The speed at which the capacitor plate 25 is returned to its zero position and therefore the damping effect of the device can be influenced in an electronic way in addition to or instead of the use of the openings in the diaphragm by an adjustment of the control velocity of the controller 29. In such a design the capacitor plate 25 is advantageously located in a evacuated space.

A mechanical damping of the deflecting part 1 for example against shocks to which the device could be exposed is obtained in a direction perpendicular to the plane of the deflecting part by the narrow arcuate slots 22, 23 and 24 which hinder the to and fro flow between the chambers 13 and 14 of the medium which is enclosed within the chamber 52.

For a mechanical damping against forces acting in the plane of the deflecting part a rim 31 provides a flow resistance in the embodiment of FIG. 1 and the absorbing rod 32 which is advantageously electrically non-conductive provides types of damping devices.

While specific embodiments of the invention have been shown and described in detail to illustrate the application of the principles of the invention, it will be understood that the invention may be embodied otherwise without departing from the such principles.

What is claimed is:

1. A device for measuring accelerations, particularly components of acceleration due to gravity, comprising a stator having first and second spaced apart electrodes, power means for applying a voltage over said electrodes, a deflecting part suspended between said first and second electrodes and being displaceable under the influence of gravity in a direction toward one of said electrodes and away from the other of said electrodes and being of a material to produce an electrical signal proportional to the displacement of said deflecting part, said deflecting part comprising a single piece flat plate disc having no magnetic properties and having a central capacitor plate portion and a plurality of radially and circumferentially spaced narrow arcuate slots, said central plate portion being suspended within said disc by lands formed between said slots, the slots of said plate disc being so narrow as to restrict air flow therethrough so that said plate disc provide a fluid damping effect, the arcuate slots being arranged in spaced apart location around the circumference and in radially spaced groups, the radially spaced slots being offset from each other, said stator comprising a housing defining a chamber on each side of said deflecting part, indicating means comprising a transducer converting the voltage into a signal and an indicator connected to said transducer for indicating the magnitude of said signal, said power means supplying an alternating current voltage on said electrodes and including means for superimposing a direct current voltage upon the alternating current voltage, a controller connected to said power means for controlling the d.c. voltage, said deflecting part having a capacitor plate and generating a voltage upon deflection, said controller controlling the d.c. voltage as a function of the voltage generated by the deflecting part to maintain the deflecting part in a zero position, and means connected to said deflecting part for indicating the magnitude of displacement as a measure of the acceleration due to gravity.

2. A device according to claim 1, wherein said indicator is provided with a scale for angles and a scale for acceleration values.

3. A device according to claim 1, including a rim extending around said deflecting part transversely to the plane thereof.

4. A device according to claim 1, wherein said deflecting part comprises a plate having a central opening therein, a rod extending through said opening and secured in said stator which is non-electrically conducting and which permits deflection of said stator by sliding movement relative to said rod.

* * * * *